United States Patent [19]

Lilie et al.

[11] Patent Number: 4,770,058
[45] Date of Patent: Sep. 13, 1988

[54] RECIPROCATING PISTON COMPRESSOR FOR SMALL REFRIGERATING MACHINES AND ITS ASSEMBLY METHOD

[75] Inventors: Dietmar E. B. Lilie; Julio F. Baumgarten, both of Joinville, Brazil

[73] Assignee: Empresa Brasileria de Compressors S/A Embraco, Brazil

[21] Appl. No.: 125,732

[22] Filed: Nov. 30, 1987

Related U.S. Application Data

[63] Continuation of Ser. No. 829,540, Feb. 13, 1986, abandoned.

[30] Foreign Application Priority Data

Mar. 8, 1985 [BR] Brazil ................................. 8501182

[51] Int. Cl.$^4$ ...................... G05G 1/00; B23P 15/00; F02B 75/32
[52] U.S. Cl. .................... 74/579 E; 29/156.5 A; 29/156.5 R; 29/156.4 R; 74/579 R; 123/197 AB; 123/197 AC
[58] Field of Search ............. 74/579 R, 579 E, 579 F; 123/197 AB, 197 AC; 29/156.5 A, 156.5 R, 156.4 R; 417/360, 363, 902

[56] References Cited

U.S. PATENT DOCUMENTS

| | | | |
|---|---|---|---|
| 1,328,509 | 1/1920 | Ganster | 74/579 E |
| 1,782,655 | 11/1930 | Jameson | 74/579 E |
| 3,538,574 | 11/1970 | Hiroyuki Toma et al. | 74/579 E |
| 3,903,753 | 9/1975 | Ottl et al. | 74/579 E |
| 3,952,393 | 4/1976 | Van Ravenzwaay et al. | 74/579 E |
| 4,406,590 | 9/1983 | Kessler | 417/360 |
| 4,422,348 | 12/1983 | Campbell | 74/579 E |
| 4,469,060 | 9/1984 | Jordan | 123/193 CH |
| 4,505,238 | 3/1985 | Jordan | 123/193 CH |
| 4,549,445 | 10/1985 | Kaufman | 74/579 E |

FOREIGN PATENT DOCUMENTS

| | | | |
|---|---|---|---|
| 0046142 | 2/1982 | European Pat. Off. | 74/579 R |
| 3123708 | 4/1982 | Fed. Rep. of Germany | 74/579 R |
| 3111947 | 10/1982 | Fed. Rep. of Germany | 74/579 R |
| 3226189 | 2/1983 | Fed. Rep. of Germany | 74/579 R |
| 252208 | 12/1947 | Switzerland | 74/579 E |
| 324803 | 10/1957 | Switzerland | 74/579 E |

*Primary Examiner*—Gary L. Smith
*Assistant Examiner*—Vinh Luong
*Attorney, Agent, or Firm*—Darby & Darby

[57] ABSTRACT

Small compressors for refrigeration usually have a motor-compressor unit suspended within a sealed housing by springs. An electric motor produces the rotation of a crankshaft having on its end portion a crank pin, which by means of a connecting rod produces the reciprocating motion of a piston in the cylinder. Two-piece connecting rods are applied to this type of machine, allowing for a new mounting procedure of the crank pin, connecting rod and wrist pin assembly. The connection of the parts is carried out in the rod of the connecting rod, and it has such a geometrical form that eliminates undesirable transverse deviations in this kind of part, ensuring full integrity of the device, without increasing mass or additional parts that impair functioning of the connecting rod. Furthermore, the fastening process is accomplished through brazing, braze-welding or glueing and can be done in reduced space conditions.

5 Claims, 2 Drawing Sheets

RECIPROCATING PISTON COMPRESSOR FOR SMALL REFRIGERATING MACHINES AND ITS ASSEMBLY METHOD

This is a continuation of application Ser No. 829,540, filed Feb. 13, 1986, now abandoned.

The present invention relates in general to a reciprocating piston compressor for small refrigerating machines and more specifically to a new construction and assembly method for the connecting rod used in such compressor.

The prior art compressors of this type show a connecting rod comprised of a first and a second eye, the first one being connected by means of a wrist pin to the reciprocating piston, and the second being connected to a crank pin which is on one end of a crankshaft. This crankshaft is orthogonal to the piston stroke and supports at the other end the rotor of an electric motor. The motor stator is supported on a crankcase that includes a crankshaft bearing portion, a cylinder, a suction and a discharge muffler. This crankcase is mounted within an outer housing by means of coil springs and this outer housing is closed with the top portion forming a hermetically sealed unit.

Because of the small size of the parts and reduced space for mounting the piston, connecting rod and crank pin assembly, there were a number of constructive solutions obtained for mounting this assembly.

Patent Specification No. 4832/73/BR discloses a constructive arrangement wherein a bushing is press fit between the second eye of the connecting rod and the crank pin. To permit assembling, the second eye of the connecting rod has an inside diameter larger than the crank pin, with the clearance between them filled in by the bushing.

Besides making the mounting somewhat difficult, this solution also requires additional parts.

Patent Specification Nos. PI 8103673/BR and EPO 0046142 disclose the solution of a slot extending through the cylinder wall so as to permit the connecting rod and the wrist pin to be inserted in the piston during the assembly. This slot in the cylinder wall carries the disadvantage of reducing its stiffness, causing dimensional deviations during cylinder machining.

Another possible solution is shown in the patent specification No. PI 8204474/BR, wherein the crankshaft and crank pin are constructed in two separate pieces connected during assembly, which becomes difficult. This solution requires the provision of additional parts to ensure the assembly of the crank pin to the crankshaft.

There is also the constructive solution of disposing the crankcase and the crankshaft bearing portion in two separate parts, which are assembled at the same time that the connecting rod is inserted over the crank pin after the piston, crank pin and connecting rod assembly is on its proper place. This solution presents the same disadvantages of that mentioned before.

The patent specification No. DE 3123708-A1 provides for a connecting rod with a head formed in two parts, which are connected by means of specially designed clamps.

This construction presents as disadvantages the high number of components for a part which would be simple in principle, besides keeping in movement an excessively increased mass.

At last, patent specification Nos. PI 8006896/BR and PI 8201683/BR provide connecting rods with two piece rods, so that these two pieces can be connected together by means of joints, usually employing pins. As in the aforementioned solution, this arrangement requires also the provision of additional parts, which increase the costs of the product, make its assembly difficult and increase the reciprocating mass.

It is the object of the present invention to disclose a new construction of connecting rod of two pieces and in a more specific way, a new connecting rod arrangement of the type comprising a two part rod, that enables an easy mounting of the piston, connecting rod and crank pin assembly without requiring the provision of additional connecting parts, which increase the costs of the product, increase its mass and make its assembly difficult.

The object of the invention is attained by providing a compressor of the aforesaid type, in which the connecting rod includes on its second eye a radial projection with a longitudinal slot, this taking at least a portion of the thickness of the radial projection presenting at least two internal end faces and two opposite lateral faces, being its first eye provided with a lengthened radial projection defining the rod of the connecting rod. This lengthened radial projection has its end portion provided with at least two end faces and two opposite lateral faces, being said end portion fitted in the slot of the projection of the second eye, being the axial distance between the centers of the first and second eye limited by approaching them toward each other, by the contact between at least two faces of the end portion of the rod and two faces of the radial projection of the second eye, and restricted from moving away one from the other by the fastening between corresponding adjacent lateral faces of the slot and the rod of the connecting rod, with said fastening ensuring the coplanar disposition between the geometrical axes of the two eyes of the connecting rod.

In accordance with an embodiment of the invention, the fastening between the adjacent lateral faces of the slot and the rod is accomplished by welding or gluing after the two pieces have been brought to a direct contact position between the stop faces of the slot and the rod and kept in the desired relative position. The welding can be carried out through the processes of brazing or braze-welding preferably by a high frequency, providing a very short heating time and avoiding deformations. It can be carried out also through application of suitable adhesives.

The basic embodiment of the present invention, as described before, ensures in advantageous way, getting a rigid joint of the two pieces of the connecting rod without using additional parts and guaranteeing the integrity of the system. The reduced amount of mass contributes for lowering the vibration level of the unit and the possible mounting procedure enables automatizing the mounting operations.

A further objective of the invention is to provide a new assembly procedure to the connecting rod of a compressor of the aforesaid type.

The invention will be described now with reference to the attached drawings in which.

Figure 1:
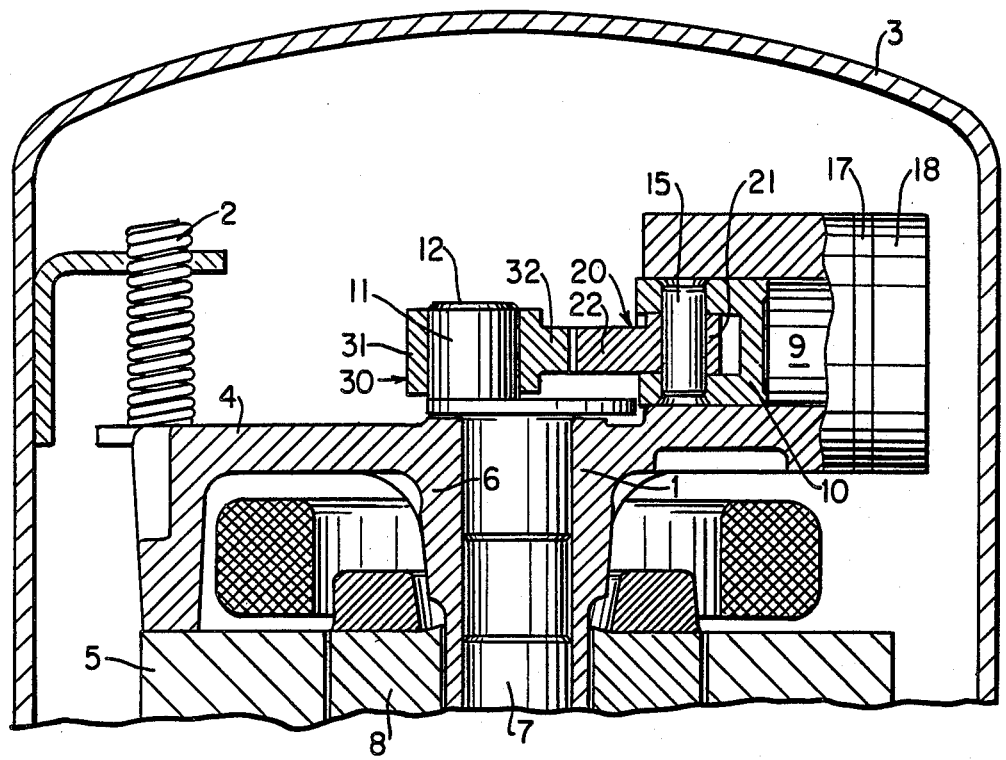
FIG. 1 shows a fragmentary diagrammatic longitudinal section through a hermetic compressor with reciprocating piston according to the present invention.

Referring to FIG. 1, the motor-compressor unit is suspended within a housing 3 by means of coil springs 2 (only one is shown). A crankcase 1 serves as support for mounting the stator 5 of the electric motor and includes a bearing portion 6 for supporting the crankshaft 7 on which is mounted in the lower section the rotor 8 of the motor. Said crankcase 1 includes yet a cylinder, inside of which reciprocates the piston 10. The crankshaft 7 has on its upper end a crank pin 11 being free at its upper end 12.

Figure 2:
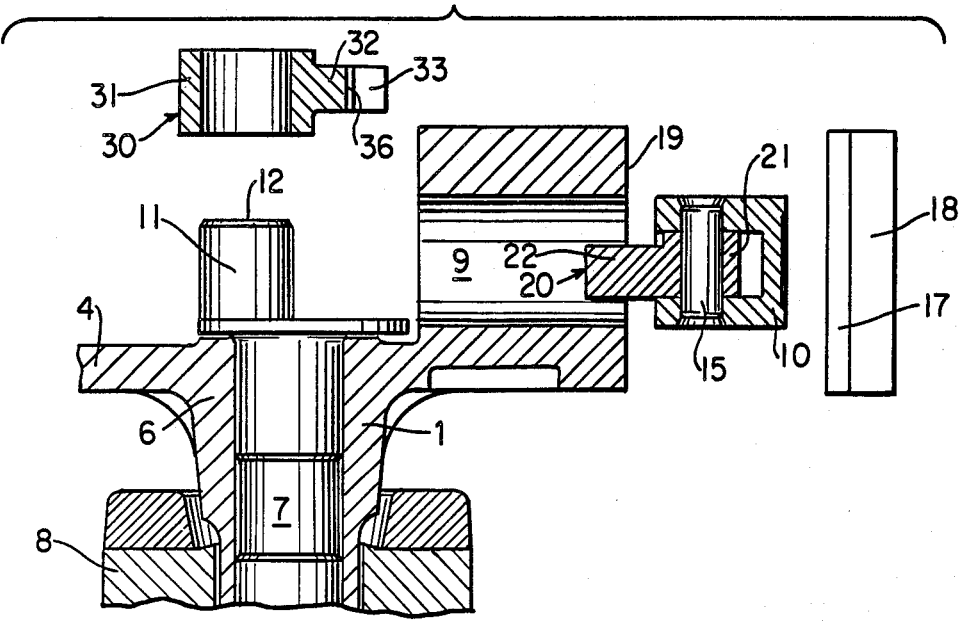
FIG. 2 shows on a larger scale a part of FIG. 1, illustrating the dismounted connecting rod and piston before assembling in the cylinder of the compressor.

As it can be observed in FIGS. 1 and 2, the cylinder 9 receives on its end opposite the crankshaft a valve plate 17 and a cylinder head 18 which can be manufactured in a conventional way. The connecting rod shown in FIGS. 3 and 4 comprises the two parts 20 and 30 and connects the piston 10 to the crank pin 11 of the crankshaft 7, as shown in FIG. 1.

A first part 20 of the connecting rod comprises the first eye 21 extending there from a lengthened radial projection 22, which defines the rod of the connecting rod, this first eye 21 being connected to the piston 10 through a wrist pin 15.

A second part 30 of the connecting rod comprises the second eye 31 which includes a short radial projection 32 provided with a longitudinal slot 33, being this second eye 31 inserted over the crank pin 11 of the crankshaft 7.

Figure 3:
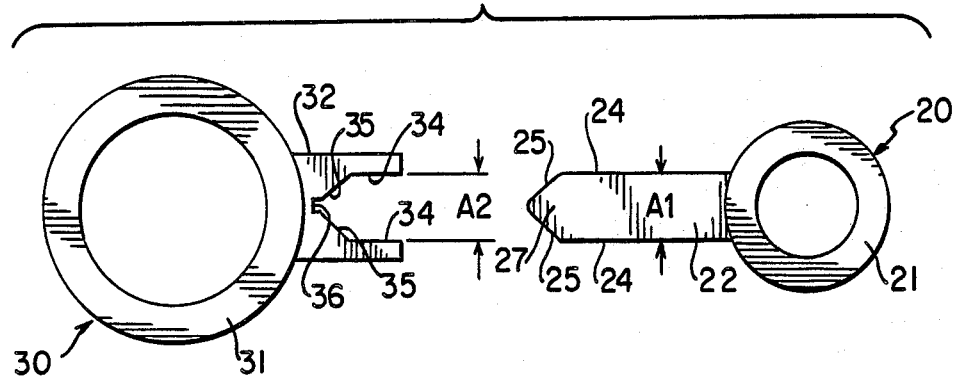
FIG. 3 shows an exploded top view of the two pieces of the connecting rod according to a preferred embodiment in which the said fastening is obtained by welding or gluing.
Figure 4:
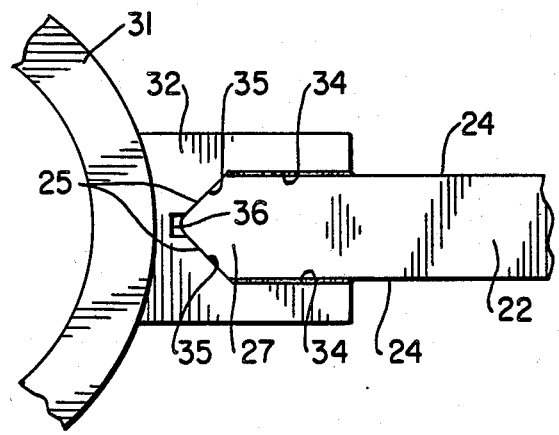
FIG. 4 shows on large scale a top view of the fitting spot of the two pieces of the connecting rod shown in FIG. 3.

In the arrangement shown in the FIGS. 3 and 4, the slot 33 of the second eye 31 takes the whole thickness of the small projection 32, presenting two opposite and parallel lateral faces 34 and two "V" shaped internal end faces, with its vertex provided with a longitudinal indentation 36. This is to avoid that the surface finishing of the slot 33 has any interference in the fitting of the two parts 20 and 30 of the connecting rod. In this arrangement, the end portion 27 of the rod 22 linked to the first eye 21 shows two "V" shaped faces 25 with somewhat rounded vertex, these faces being dimensioned to permit a perfect contact with the respective internal end walls 35 of the slot 33.

This "V" shaped fitting eliminates undesirable transverse deviations in this kind of part, enabling a self-aligning fitting which will keep the correct axial distance between the first and second eyes besides keeping the coplanarity of its geometrical axes during the fastening operation (to be explained ahead) without needing additional external devices to control the relative position between the two pieces of the connecting rod during assembly.

In this arrangement the width A1 of the end portion of the rod 22 is slightly smaller than the width A2 of the slot 33 so as to provide a small clearance between the lateral walls 34 of the slot 33 and the adjacent lateral walls 24 of the end portion 27 of the rod 22. This small clearance does not impair the relative position of the two parts, because of the "V" shaped fitting of the end walls, and it ensures the relative axial fastening between the two pieces, carrying out a welding operation by brazing or braze-welding, or gluing the adjacent lateral walls of the two pieces, filling in the space therebetween.

The mounting procedure for the constructive solution defined in the FIGS. 3 and 4 will be described next, FIG. 2 being observed for a better understanding.

The crankshaft 7 is introduced into the bearing portion 6 by the upper side of the crankcase 4. The second eye 31 of the connecting rod is then inserted over the crank pin 11. With removed valve plate 17 and cylinder head 18, the assembly, formed by the first eye 21 of the connecting rod, the piston 10 and the wrist pin 15 already mounted, is introduced into the cylinder 9 by the free end 19. This assembly is then moved toward the other part of the connecting rod at the same time that it can be spun inside the cylinder so as to permit a perfect connection of the parts 20 and 30 of the connecting rod. A punch (not illustrated) also introduced through the cylinder 9 by the free end 19, presses lightly the piston head 10 against the crank pin 11, which is in the position corresponding to bottom dead center. In this way, the end portion of the rod 22 is kept correctly fitted inside the slot 33, while the welding or gluing of the parts is performed.

The type of fitting shown here allows for full transmission of force through the connecting rod, with a high level of reliability and enabling mounting in reduced space conditions.

We claim:

1. Reciprocating piston compressor for small refrigerating machines, comprising a connecting rod with a first eye connected to a compressor piston by means of a wrist pin and with a second eye connected to a crank pin of a crankshaft, said second eye of the connecting rod including a radial projection provided with a longitudinal slot occupying at least a portion of the thickness of the radial projection and presenting at least two internal end faces and two opposite lateral faces, said first eye provided with a lengthened radial projection defining the rod of the connecting rod and having its end portion provided with at least two end faces and two opposite lateral faces and fitted in a slot of the second eye, the axial distance between centers of the eyes being limited, in approaching toward each other, through contact between at least two surfaces of the end portion of the rod and two corresponding stop surfaces of the radial projection of the second eye, and in moving away from the other, being restricted by a fastening between the corresponding adjacent lateral faces of the slot of the radial projection of the second eye and the rod, with said fastening keeping a coplaner disposition of the geometrical axes of the two eyes.

2. Reciprocating piston compressor for small refrigerating machines according to claim 1, wherein said surfaces which limit the distance between the first and second eyes are defined, in approaching toward each other, by the end faces of the slot and the rod.

3. Reciprocating piston compressor for small refrigerating machines according to claim 2, wherein contact of said end faces of the rod with the corresponding end faces of the slot leads to the coplanar disposition of the geometrical axes of the eyes.

4. Reciprocating piston compressor for small refrigerating machines according to claim 3, wherein end faces of the slot of the radial projection of the second eye are defined by two "V" shaped faces, the end faces of the rod being also defined by two "V" shaped faces which touch the two end faces of the slot.

5. Reciprocating piston compressor for small refrigerating machines according to claim 2, wherein the width of the end portion of the rod is smaller than the width of the slot, so as to define a clearance between the lateral walls of the rod and the slot, the fastening between the adjacent lateral faces of the end portion of the rod and the slot is accomplished by filling said clearance with a binding material at least partially.

* * * * *

UNITED STATES PATENT AND TRADEMARK OFFICE
CERTIFICATE OF CORRECTION

PATENT NO. : 4,770,058

DATED : September 13, 1988

INVENTOR(S) : Lilie et al.

It is certified that error appears in the above-identified patent and that said Letters Patent are hereby corrected as shown below:

ON THE TITLE PAGE:

Change the Assignee from "Empresa Brasileria de Compressors" to -- Empresa Brasileira de Compressores --

Signed and Sealed this

Thirty-first Day of January, 1989

*Attest:*

DONALD J. QUIGG

*Attesting Officer*   *Commissioner of Patents and Trademarks*